United States Patent
Yoon et al.

(10) Patent No.: US 9,514,109 B2
(45) Date of Patent: Dec. 6, 2016

(54) COMPUTER-IMPLEMENTED SYSTEMS AND METHODS FOR SCORING OF SPOKEN RESPONSES BASED ON PART OF SPEECH PATTERNS

(71) Applicant: Educational Testing Service, Princeton, NJ (US)

(72) Inventors: Su-Youn Yoon, Lawrenceville, NJ (US); Suma Bhat, Champaign, IL (US)

(73) Assignee: Educational Testing Service, Princeton, NJ (US)

(*) Notice: Subject to any disclaimer, the term of this patent is extended or adjusted under 35 U.S.C. 154(b) by 227 days.

(21) Appl. No.: 13/739,278

(22) Filed: Jan. 11, 2013

(65) Prior Publication Data

US 2013/0185057 A1 Jul. 18, 2013

Related U.S. Application Data

(60) Provisional application No. 61/585,913, filed on Jan. 12, 2012.

(51) Int. Cl.
| | | |
|---|---|---|
| *G06F 17/27* | (2006.01) | |
| *G06F 17/24* | (2006.01) | |
| *G09B 19/04* | (2006.01) | |
| *G09B 19/06* | (2006.01) | |
| *G10L 15/26* | (2006.01) | |

(52) U.S. Cl.
CPC .............. *G06F 17/24* (2013.01); *G06F 17/27* (2013.01); *G06F 17/274* (2013.01); *G09B 19/04* (2013.01); *G09B 19/06* (2013.01); *G10L 15/26* (2013.01)

(58) Field of Classification Search
CPC ............................. G06F 17/27; G06F 17/274
USPC ................................... 704/1, 4, 9
See application file for complete search history.

(56) References Cited

U.S. PATENT DOCUMENTS

| | | | | |
|---|---|---|---|---|
| 5,477,448 A | * | 12/1995 | Golding et al. | 704/9 |
| 5,485,372 A | * | 1/1996 | Golding et al. | 704/9 |
| 5,521,816 A | * | 5/1996 | Roche et al. | 704/9 |
| 5,537,317 A | * | 7/1996 | Schabes et al. | 704/9 |
| 5,799,269 A | * | 8/1998 | Schabes | G06F 17/274 704/9 |
| 8,775,160 B1 | * | 7/2014 | Roizen | G06F 17/30684 704/10 |
| 2004/0049391 A1 | * | 3/2004 | Polanyi | G10L 15/1807 704/271 |
| 2009/0070100 A1 | * | 3/2009 | Bajaj | G06F 17/274 704/9 |
| 2009/0275005 A1 | * | 11/2009 | Haley | 434/169 |
| 2010/0145698 A1 | * | 6/2010 | Chen | G09B 7/02 704/256.1 |
| 2011/0270605 A1 | * | 11/2011 | Qin et al. | 704/9 |

(Continued)

OTHER PUBLICATIONS

Ron Cowan, "The Teacher's Grammar of English: A Course Book and Reference Guide," Cambridge University Press, May, 2008.*

(Continued)

*Primary Examiner* — Pierre-Louis Desir
*Assistant Examiner* — Forrest F Tzeng
(74) *Attorney, Agent, or Firm* — Jones Day

(57) ABSTRACT

Systems and methods are provided for scoring a speech sample. Automatic speech recognition is performed on the speech sample using an automatic speech recognition system to generate a transcription of the sample. Words in the transcription are associated with parts of speech, and part of speech sequences are extracted from the parts of speech associations. A grammar metric is generated based on the part of speech sequences, and the speech sample is scored based on the grammar metric.

21 Claims, 7 Drawing Sheets

(56) References Cited

U.S. PATENT DOCUMENTS

2012/0016672 A1* 1/2012 Chen et al. .................. 704/236
2013/0262110 A1* 10/2013 Xie ....................... G10L 15/183
                                                          704/235

OTHER PUBLICATIONS

Bardovi-Harlig, Kathleen, Bofman, Theodora; Attainment of Syntactic and Morphological Accuracy by Advanced Language Learners; Studies in Second Language Acquisition, 11; pp. 17-34; 1989.

Bernstein, Jared, Cheng, Jian, Suzuki, Masanori; Fluency and Structural Complexity as Predictors of L2 Oral Proficiency; Proceedings of InterSpeech; pp. 1241-1244; 2010.

Chen, Lei, Yoon, Su-Youn; Detecting Structural Events for Assessing Non-Native Speech; Proceedings of the 6th Workshop on Innovative Use of NLP for Building Educational Applications; pp. 38-45; 2011.

Chen, Miao, Zechner, Klaus; Computing and Evaluating Syntactic Complexity Features for Automated Scoring of Spontaneous Non-Native Speech; Proceedings of the 49th Annual Meeting of the Association for Computational Linguistics; pp. 722-731; 2011.

Chen, Lei, Tetreault, Joel, Xi, Xiaoming; Towards Using Structural Events to Assess Non-Native Speech; Proceedings of the NAACL HLT 2010 Fifth Workshop on Innovative Use of NLP for Building Educational Applications; pp. 74-79; 2010.

Covington, Michael, He, Congzhou, Brown, Cati, Naci, Lorina, Brown, John; How Complex is That Sentence? A Proposed Revision of the Rosenberg and Abbudeto D-Level Scale; CASPR Research Report Jan. 2006; 2006.

Cucchiarini, Catia, Strik, Helmer, Boves, Lou; Quantitative Assessment of Second Language Learners' Fluency: Comparisons Between Read and Spontaneous Speech; Journal of the Acoustical Society of America, 111(6); pp. 2862-2873; 2002.

Franco, Horacio, Neumeyer, Leonardo, Kim, Yoon, Ronen, Orith; Automatic Pronunciation Scoring for Language Instruction; ICASSP '97; pp. 1471-1474; 1997.

Hunt, Kellogg; Syntactic Maturity in School Children and Adults; Monographs of the Society for Research in Child Development, Serial No. 134, 35(1); pp. 1-67; 1970.

Lu, Xiaofei; Automatic Measurement of Syntactic Complexity in Child Language Acquisition; International Journal of Corpus Linguistics, 14(1); pp. 3-28; 2009.

Lu, Xiaofei; Automatic Analysis of Syntactic Complexity in Second Language Writing; International Journal of Corpus Linguistics, 15(4); pp. 474-496; 2010.

Neumeyer, Leonardo, Franco, Horacio, Digalakis, Vassilios, Weintraub, Mitchel; Automatic Scoring of Pronunciation Quality; Speech Communication; pp. 88-93; 2000.

Ortega, Lourdes; Syntactic Complexity Measures and Their Relationship to L2 Proficiency: A Research Synthesis of College-Level L2 Writing; Applied Linguistics, 24(4); pp. 492-518; 2003.

Rosenberg, Sheldon, Abbeduto, Leonard; Indicators of Linguistic Competence in the Peer Group Conversational Behavior of Mildly Retarded Adults; Applied Psycholinguistics, 8; pp. 19-32; 1987.

Temple, Liz; Second Language Learner Speech Production; Studia Linguistica, 54(2); pp. 288-297; 2000.

Witt, Silke, Young, Steve; Performance Measures for Phone-Level Pronunciation Teaching in CALL; Workshop on Speech Technology in Language Learning; pp. 99-102; 1997.

Witt, Silke; Use of Speech Recognition in Computer-Assisted Language Learning; Unpublished Dissertation, Cambridge University Engineering Department; Cambridge, UK; 1999.

Zechner, Klaus, Higgings, Derrick, Xi, Xiaoming, Williamson, David; Automatic Scoring of Non-Native Spontaneous Speech in Tests of Spoken English; Speech Communication, 51(10); pp. 883-895; 2009.

* cited by examiner

COMPUTER-IMPLEMENTED SYSTEMS AND METHODS FOR SCORING OF SPOKEN RESPONSES BASED ON PART OF SPEECH PATTERNS

CROSS-REFERENCE TO RELATED APPLICATIONS

This application claims the benefit of U.S. Provisional Patent Application No. 61/585,913 filed on Jan. 12, 2012, the entire contents of each of which are incorporated herein by reference.

TECHNICAL FIELD

This document relates generally to automated response scoring and more particularly to automated scoring of spoken responses.

BACKGROUND

Automated speech assessment systems are used in conjunction with standardized or other tests designed to test a speaker's proficiency in speaking a certain language (e.g., Pearson Test of English Academic, Test of English as a Foreign Language, International English Language Testing System). In these tests, a verbal response is elicited from a test-taker by providing a test prompt, which asks the test-taker to construct a particular type of verbal response. For example, the test prompt may ask the test-taker to read aloud a word or passage, describe an event, or state an opinion about a given topic. The test-taker response is received at a computer-based system and certain features of the response are analyzed to generate a score.

SUMMARY

In accordance with the teachings herein, systems and methods are provided for scoring a speech sample. Automatic speech recognition is performed on the speech sample using an automatic speech recognition system to generate a transcription of the sample. Words in the transcription are associated with parts of speech, and part of speech sequences are extracted from the parts of speech associations. A grammar metric is generated based on the part of speech sequences, and the speech sample is scored based on the grammar metric.

As another example, a system for scoring a speech sample includes one or more data processors and one or more computer-readable mediums responsive to the one or more data processors. The one or more computer-readable mediums include instructions for commanding the one or more data processors to perform steps. In the steps, automatic speech recognition is performed on the speech sample using an automatic speech recognition system to generate a transcription of the sample. Words in the transcription are associated with parts of speech, and part of speech sequences are extracted from the parts of speech associations. A grammar metric is generated based on the part of speech sequences, and the speech sample is scored based on the grammar metric.

As a further example, a computer-readable medium is encoded with instructions for commanding one or more data processors to execute steps. In the steps, automatic speech recognition is performed on the speech sample using an automatic speech recognition system to generate a transcription of the sample. Words in the transcription are associated with parts of speech, and part of speech sequences are extracted from the parts of speech associations. A grammar metric is generated based on the part of speech sequences, and the speech sample is scored based on the grammar metric.

DETAILED DESCRIPTION

Figure 1:
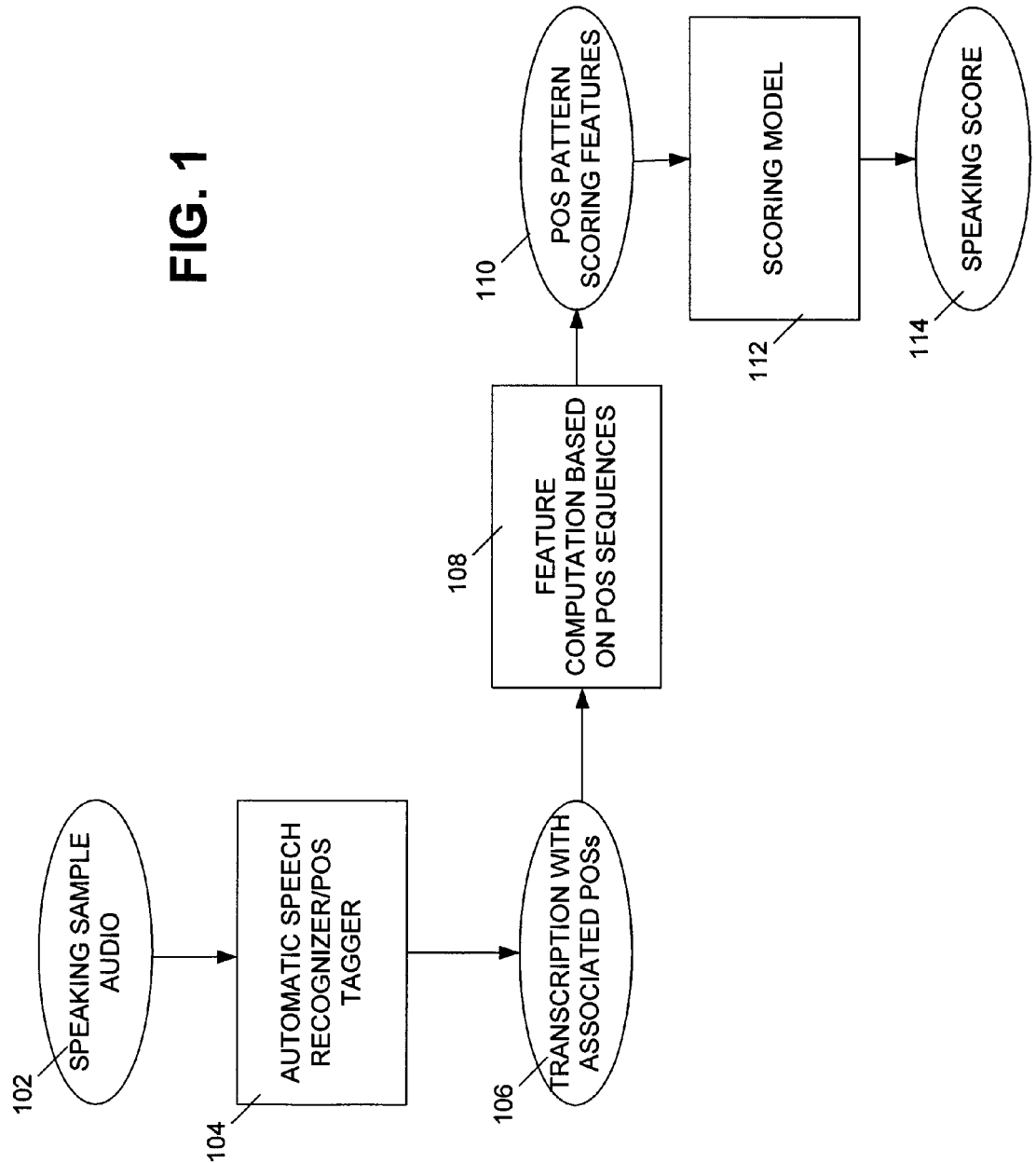
FIG. 1 is a block diagram depicting a computer-implemented system for scoring a speech sample.

FIG. 1 is a block diagram depicting a computer-implemented system for scoring a speech sample. The system of FIG. 1 captures differences in the distribution of morphosyntactic features or grammatical expressions across different speaking proficiencies to measure a speaker's grammar usage abilities, including syntactic competence. Grammar usage is often one of the dimensions of language ability that is assessed during speaking proficiency level testing, such as non-native proficiency level testing in a foreign language. Overall proficiency can be assessed by testing the speaker's abilities in various areas, such as fluency, pronunciation, intonation, grammar, vocabulary, and discourse structure. The system of FIG. 1 generates scoring features that are indicative of the range of grammar forms utilized by a speaker as well as the sophistication and accuracy of such forms, to identify the strength of that speaker's grammar usage.

In FIG. 1, an audio recording 102 of a spoken speech sample is provided to an automatic speech recognizer and part of speech (POS) tagger 104. For example, the spoken speech sample may be a recording of a non-native speaker being examined for abilities in speaking a language that is not native to the speaker. The automated speech recognizer 104 may take a variety of forms. For example, the automated speech recognizer that is part of block 104 may be a Hidden Markov Model recognizer trained on native or non-native English speech collected from a number of speakers. In one example, a gender independent triphone acoustic model and combination of bigram, trigram, and tetragram language models is used to attempt to generate a transcription the words present in the speech sample 102.

The identified words in the transcription are then associated with parts of speech by the part of speech tagger portion of block 104. For example, individual words or groups of words are labeled with part of speech identifiers, such as noun, verb, adjective, and adverb. In one example, part of speech tags are associated with the words in the transcription using an English part of speech tagger implemented in the OpenNLP toolkit trained on the Switchboard data. The automatic speech recognizer and part of speech tagger 104 outputs the transcription along with associated part of speech labels at 106 for feature computation 108. For example, for a speech sample 102 that is recognized by the automatic speech recognizer as reciting, "I see the brown dog," the part of speech tagger might associated parts of speech as "I (pronoun) see (verb) the (article) brown (adjective) dog (noun)."

At 108, part of speech sequences are extracted from the part of speech sequences identified in the transcription 106, and part of speech pattern grammar scoring feature 110 is generated based on the extracted part of speech sequences. For the example noted above, part of speech sequences detected in the sample may include: Pronoun-Verb, Verb-Article-Adjective-Noun, and Adjective-Noun. The part of speech pattern grammar scoring feature 110 is provided, along with in some cases additional scoring features (e.g., fluency and prosody features), to a scoring model 112 for generation of a speaking score 114 that identifies a quality level of the speaking sample 102.

Figure 2:
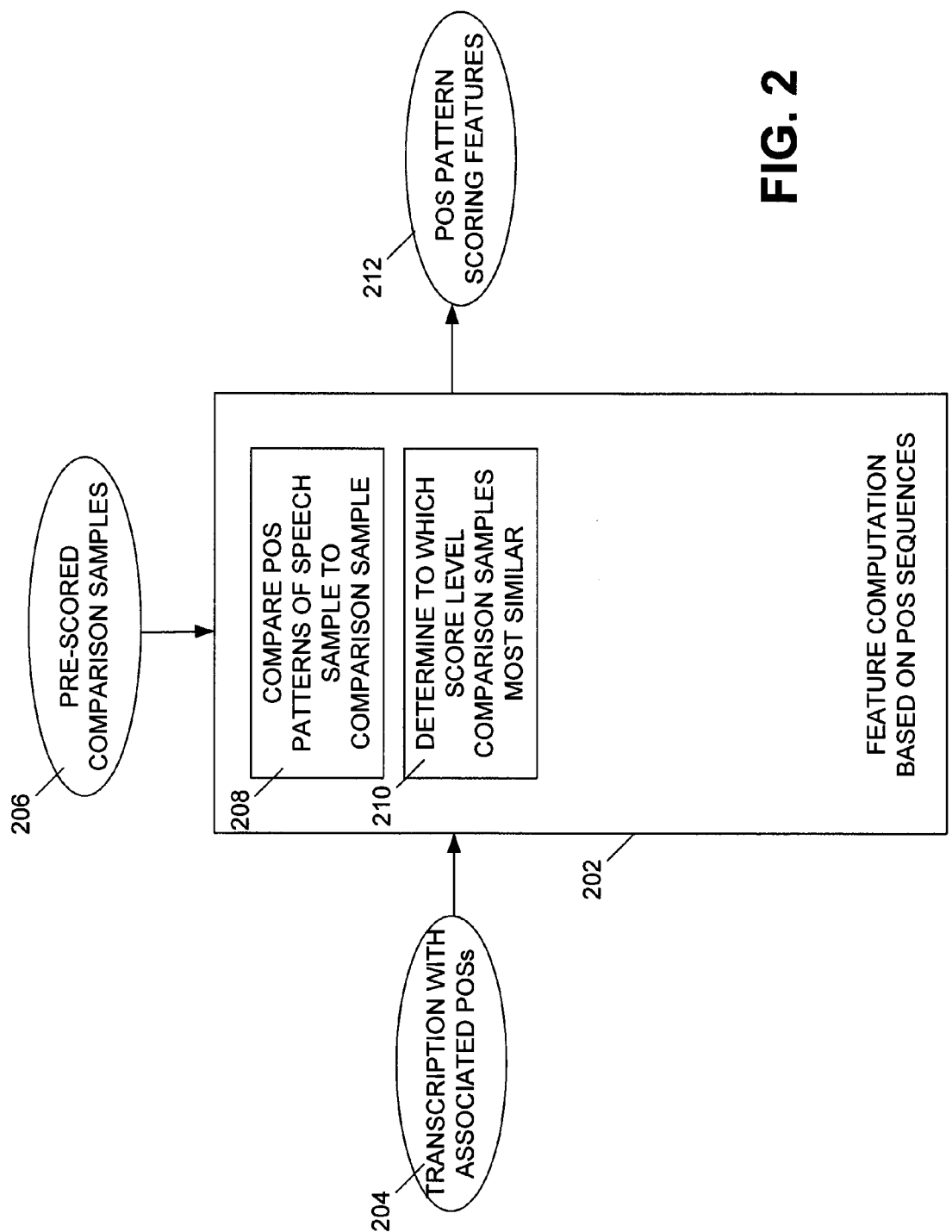
FIG. 2 is a block diagram depicting an example feature computation based on part of speech sequences detected in a speech sample.

FIG. 2 is a block diagram depicting an example feature computation based on part of speech sequences detected in a speech sample. A feature computation module 202 receives a transcription of spoken speech that has undergone part of speech tagging at 204. The feature computation module 202 further receives pre-scored comparison samples 206 with which to compare the part of speech labeled transcription 204. For example, the pre-scored comparison samples may be based on spoken responses (by native speakers or non-native speakers) that have been previously scored for grammar usage, such as by a human scorer. In one example, the comparison samples 206 have previously been assigned a score (e.g., 4 for highest quality responses, 3, 2, and 1 for lowest quality responses). The comparison samples 206 may include the full transcription for each of the comparison samples 206 or the comparison samples may be a stream of part of speech tags that have been associated with the content of the comparison samples, along with the score level assigned to the comparison samples.

At 208, the feature computation module 202 compares the part of speech patterns 204 of the speech sample 204 to the part of speech patterns in the comparison samples 206 at each scoring level. In one example, a level score is determined for each of the scoring levels (e.g., 4, 3, 2, and 1) that indicates a level of similarity between the part of speech patterns of the speech sample 204 and the part of speech patterns in the comparison samples 206 at that scoring level. At 210, a determination is made as to which scoring level the part of speech patterns 204 for the speech sample to be scored are most similar. For example, if the level similarity scores are: scoring level 4—0.65, scoring level 3—0.86, scoring level 2—0.77, and scoring level 1—0.33, then scoring level 3 is identified as having part of speech patterns most similar to those of the speech sample 204. A part of speech pattern scoring feature, such as an identification of the most similar scoring level, is output at 212. In another example, the level similarity score for the highest scoring level (4) is output at 212. In the present example, the output 212 would be 0.65.

Figure 3:
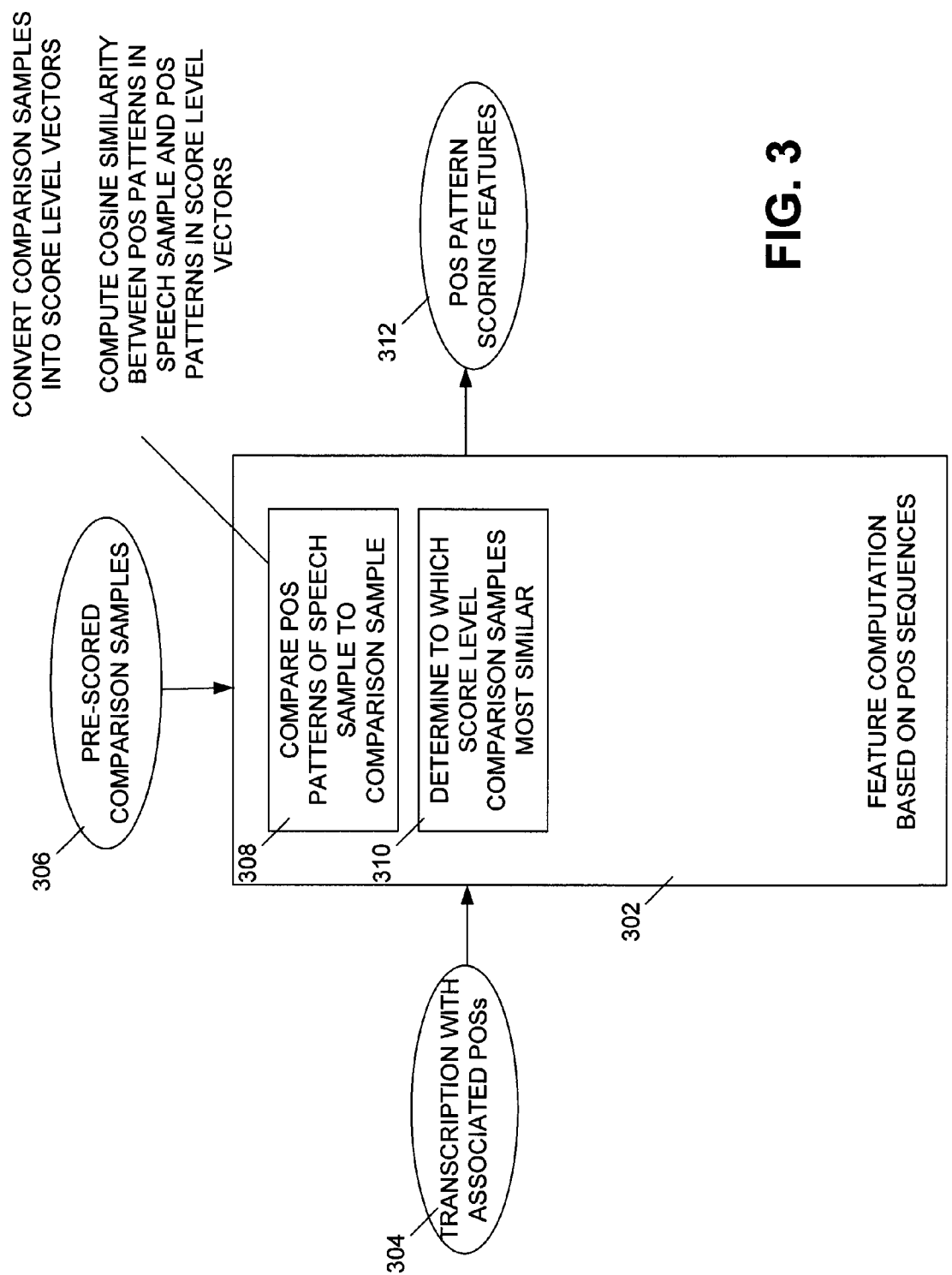
FIG. 3 is a block diagram depicting example feature computation for a scoring sample based on part of speech sequences.

FIG. 3 is a block diagram depicting example feature computation for a scoring sample based on part of speech sequences. A feature computation module 302 receives part of speech sequences 304 associated with a speech sample as well as part of speech sequences 306 associated with comparison samples that have been assigned to different score levels. At 308, the part of speech patterns of the speech sample 304 are compared to the part of speech patterns of the comparison samples at each level to determine similarity. In one example, the part of speech patterns associated with all of the comparison samples 306 at a particular score level are concatenated to generate a score level vector of parts of speech. The score level vector is then compared to a vector of parts of speech associated with the speech sample to generate a cosine similarity score for the particular score level.

Cosine similarity measures similarity between the part of speech patterns in the speech sample and the part of speech samples in the score level vector by measuring the cosine of the angle between the vectors in a high-dimensional space, with each term in the vectors corresponding to a unique dimension. If the vectors are similar and share a number of terms, a small angle is determined. In one example of detecting part of speech sample similarity, a term is a single or compound part of speech tag (the generation of compound part of speech tags is described herein below with respect to FIG. 4). Each term is weighted using a term frequency-inverse document frequency (tf-idf) scheme. To implement the cosine similarity calculation, the inverse document frequency is calculated from the entire pre-scored comparison sample, with each comparison sample being treated as a document. Part of speech patterns in the same score level are concatenated to generate a single score level vector for each score level (e.g., four score level vectors). For each speech sample to be scored, a level score is calculated for each score level according to:

$$\cos(\vec{q}, \vec{d_j}) = \frac{\sum_{i=1}^{n} q_i d_{ji}}{\sqrt{\sum_{i=1}^{n} q_i^2 \sum_{i=1}^{n} d_i^2}}$$

$$q_i \equiv tf(t_i, \vec{q}) \times \log\left(\frac{N}{df(t_i)}\right)$$

$$d_{ji} \equiv tf(t_i, \vec{d_j}) \times \log\left(\frac{N}{df(t_i)}\right)$$

where $\vec{q}$ is a vector of the speech sample, $\vec{d_j}$ is a score level vector, n is the total number of part of speech sequences, tf $(t_i, \vec{q})$ is the term frequency of part of speech sequence $t_i$ in the speech sample, tf$(t_i, \vec{d_i})$ is the term frequency of part of speech sequence $t_i$ in the score level vector, N is the total number of comparison samples, and df $(t_i)$ is the document frequency of part of speech sequence $t_i$ in all of the comparison samples.

Level scores can also be determined via cross-entropy using multiple language models. Part of speech patterns in the same score level are concatenated to generate a single score level vector for each score level (e.g., four score level vectors). A language model is created for score level using each score level vector according to:

$$P(t_i | t_{i-1}, \ldots, t_{i-(n-1)}) = \frac{C(t_i, t_{i-1}, \ldots, t_{i-(n-1)})}{C(t_{i-1}, \ldots, t_{i-(n-1)})}$$

where $t_i$ is part of spseech of $i^{th}$ word,
$C(t_{i-1}, \ldots, t_{i-(n-1)})$ is number of occurences of parts of speech sequence $t_{i-1}, \ldots, t_{i-(n-1)}$,
n is number of parts of speech in each sequence For each speech sample, a level score is calculated for each score level according to:

$$ppl(\vec{q}, \vec{d}) = \sum_{i=1}^{N} p(t_i | t_{i-1}, \ldots, t_{i-(n-1)})/N$$

where $p(t_i|t_{i-1}, \ldots, t_{i-(n-1)})$ is a conditional probability of parts of speech sequence $(t_i|t_{i-1}, \ldots, t_{i-(n-1)})$ in a language model $\vec{d}$, N is count of words in the transcription The level scores are compared to one another at 310 to determine to which score level comparison samples the speech sample's part of speech patterns are most similar. At 312, a part of speech pattern scoring feature is output based on the level scores and/or the score level to which the speech sample is determined to be most similar.

Figure 4:
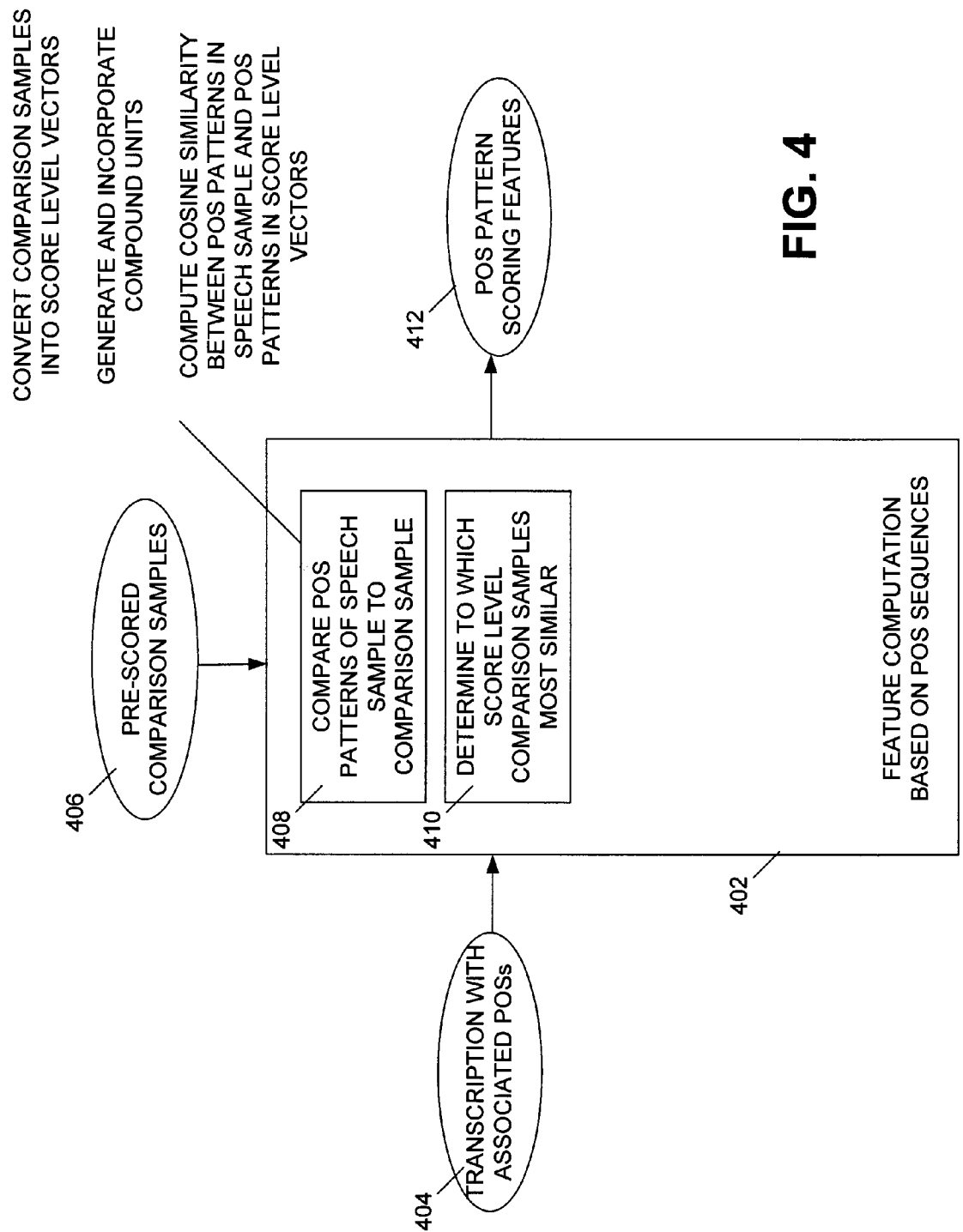
FIG. 4 is a block diagram depicting capturing the degree of syntactic competence exhibited by a speaker through detection of frequent occurrence of part of speech sequences.

In addition to using single word terms in part of speech pattern matching, frequent part of speech sequences can be captured via measures such as mutual information. Proficient learners are sometimes characterized by increased automaticity in speech production. These speakers tend to memorize frequently used multi-word sequences as a chunk and retrieve the entire chunk as a single unit. This degree of automaticity can be captured through detection of frequent occurrence of part of speech sequences with high mutual information, as detected in the example of FIG. 4. In FIG. 4, a feature computation module 402 receives a part of speech vector 404 associated with a speech sample as well as part of speech patterns 406 associated with a number of comparison samples associated with different scoring levels. The comparison sample vectors at each level are preprocessed to identify compound part of speech tags using mutual information.

In one example, part of speech bigrams with high mutual information are selected and used as a single unit. For example, all part of speech bigrams that occurred less than 50 times are filtered out. Remaining part of speech bigrams are sorted by mutual information scores, and a set of bigrams is generated (e.g., a top 25 set, a top 50 set, or a top 100 set). The part of speech pairs in the set are transformed into compound tags and are appended onto the score level vectors. The scoring sample vectors may be transformed to identify the bigrams in the set so that their appearance in the speech sample will be detected. At 408, the part of speech patterns of the speech sample are compared to the score level vectors, and at 410, a determination is made as to which score level the part of speech patterns in the speech sample 404 are most similar. A part of speech pattern scoring feature 412 is outputted based on that determination at 410.

In addition to comparing part of speech patterns of a speech sample to those of comparison samples, a feature computation module can compare part of speech patterns in the speech sample to a set of part of speech patterns known to have certain relationships with speech of different quality levels. For example, some part of speech patterns may be absent in low proficiency responses (i.e., grammatically sophisticated sequence). Thus, the presence of those part of speech patterns may contribute to a scoring feature indicative of higher quality. Examples of patterns that may be included in the grammatically sophisticated sequence patterns include the WP and WDT patterns. WP is a Wh-pronoun while WDT is WH-determiner. Because most sentences are declarative sentences, 'Wh' phrase signals use a relative clause. Lack of these sequences strongly supports the supposition that the response is a low quality response because the speaker does not use relative clauses or only uses them in limited situations. Examples of grammatically sophisticated sequence group include: NN-WP (noun-relative pronoun-relative clause)—"A boy who wrote a letter . . . ."

In another example of grammatically sophisticated sequences, a certain part of speech pattern may appear increasingly in higher quality speech samples. Examples of this group include verb infinitive patterns TO_VB, passive forms VB_VBN, VBD_VBN, VBN, VBN_IN, VBN_RP, and gerund forms VBG, VBG_RP, VBG_TO. Other patterns include comparative groups that identify comparative sentences. Examples of this group include:

VB-VBN (verb base form-verb past participle)—"A container could be designed to carry water."

VBD-VBN (verb past form-verb past participle)—"Cookies were sold by boys."

Alternatively, another part of speech pattern may appear decreasingly in higher quality speech samples, identifying potentially unsophisticated grammar usage. The grammatically unsophisticated sequence group can include certain noun or proper noun related expressions, where their high proportion is consistent with the tendency of low proficiency speakers to use nouns more frequently. The grammatically unsophisticated sequence group may also include simple tense verb patterns VB and simple past and present forms such as PRB_VBD, VB, VBD_TO, VBP_TO, VBZ.

Further, another part of speech pattern may be strongly associated with grammatical errors (ERROR). The ERROR group may include interjection and filler words UH and GW. ERROR group may also include tags in the non-compound group, such as DT, MD, RBS, and TO, that have related compound tags. The non-compound tags are associated with the expressions that do not co-occur with the strongly related words, and they tend to be related to errors (e.g., the non-compound MD tag signals that there is an expression where a modal verb is not followed by a verb VB (base form), such as "the project may can change" and "the others must can not be good.") Additional ERROR patterns can include comparative adverbs RBR and comparative adjectives JJR, where the combination of these tags is strongly related to double marked errors, such as "more easier."

Examples of grammatically erroneous sequences include:

MD-VBZ (modal verb-3$^{rd}$ person singular verb)—"Her advisors can explains the situation." "He cannot receives it."

RBR-JJR (comparative adverb-comparative adjective)—"It gets more cheaper." "But it is more bigger now."

The following table identifies example patterns that may be associated with the different part of speech pattern groups:

| Group | List |
| --- | --- |
| Grammatically erroneous sequence | UH, GW, XX, RBR JJR, RBR JJS, MD VBP, MD VBZ |
| Grammatically unsophisticated sequence | VB, VBD, VBD TO, VBP TO, VBZ, VBZ RB, VBZ VBG |
| Grammatically sophisticated sequence | WDT JJS, WDT NNPS, WP NN, WP NNS, WP BES, RBR JJ, VB VBN, VBD VBN, VBG RP, VBG TO, VBN IN, VBN RP |

Figure 5:
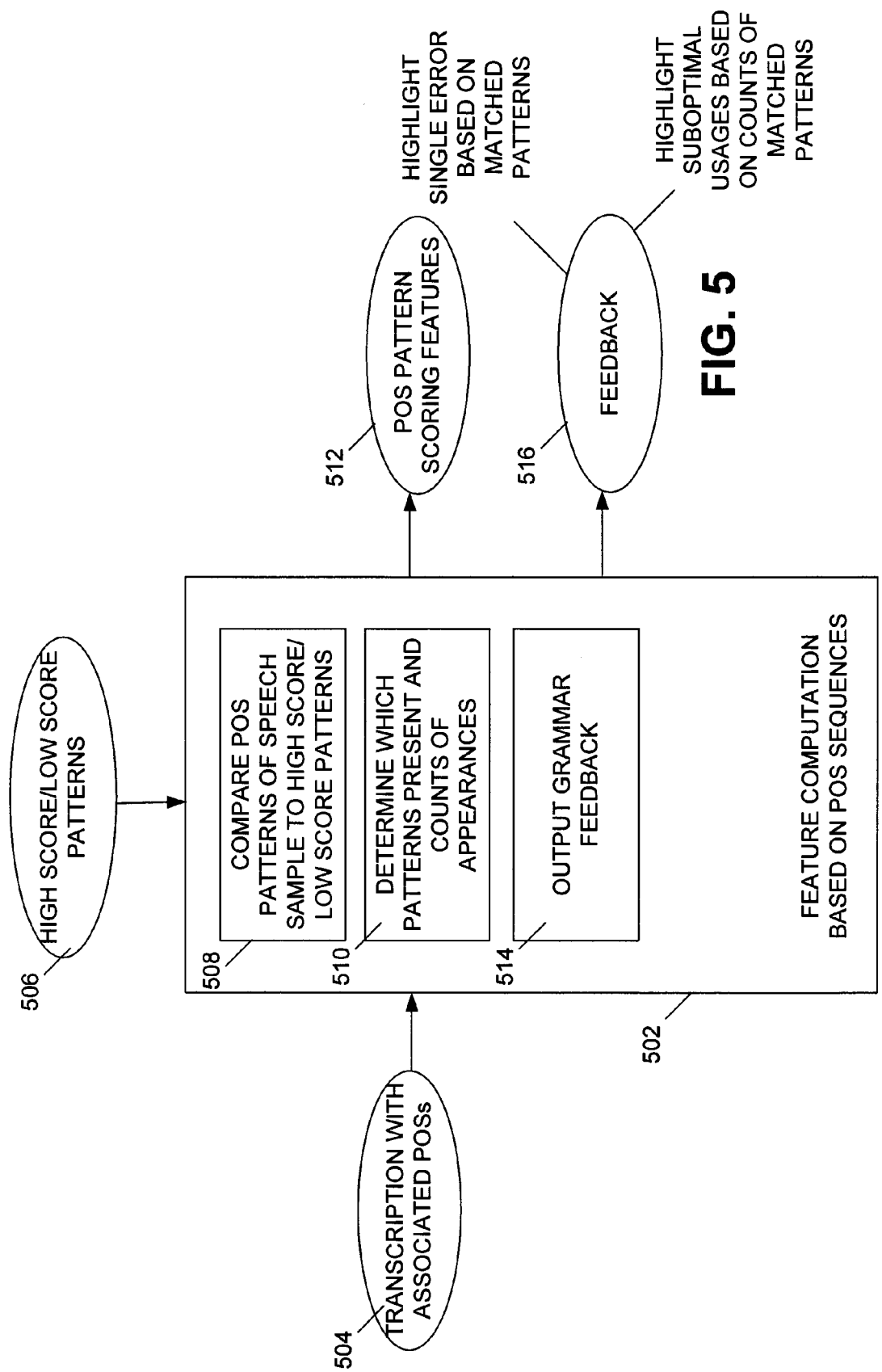
FIG. 5 is a block diagram depicting the determination of part of speech pattern scoring features based on an identification of pre-determined part of speech patterns.

FIG. 5 is a block diagram depicting the determination of part of speech pattern scoring features based on an identification of pre-determined part of speech patterns. A feature computation module 502 receives a transcription having associated part of speech 504 and a high score/low score pattern file 506 that identifies part of speech patterns associated with different levels of speaking proficiency (e.g., a grammatically erroneous sequence, a grammatically unsophisticated sequence, or grammatically sophisticated sequence described above). At 508, the feature computation module 502 compares the part of speech patterns in the speech sample 504 with the pattern file 506, and at 510 a determination is made as to which patterns are present and how many of each type of pattern are identified in the speech sample 504. A part of speech scoring feature 512 is determined based on the counts determined at 510. For example, the scoring feature 512 may be adjusted toward higher quality when grammatically sophisticated sequence patterns are identified and adjusted toward lower quality when grammatically erroneous sequence, a grammatically unsophisticated sequence patterns are identified.

The feature computation module 502 may also output grammar feedback at 514. For example, when the feature computation module 502 is utilized as part of a speech training or practice implementation, feedback 516 can be provided to a speaker to help identify errors or suboptimal grammar patterns so that the speaker can improve. Feedback may be provided based on a variety of factors. For example, feedback may be provided based on a detection of an ERROR part of speech pattern in the speech sample 504. For example, detection of an ERROR pattern may be highlighted on a graphical user interface, identifying the words in the transcript associated with the pattern, an identification of the error, a description of the error, and suggestions for eliminating the error. In another example, high counts of certain patterns may be highlighted as feedback. For example, over use of proper nouns may be associated with unsophisticated speech. A high proper noun count may be highlighted for a speaker along with suggestions, such as the use of pronouns to improve speech flow that can be interrupted by overuse of proper nouns. In another example, the feature computation module 502 may store pre-compiled feedbacks for particular pattern and return the associated feedback for the particular pattern if the pattern is present or missing in the responses. (e.g., A feedback stating that 'the base form verb should be used after a modal verb' is stored and associated with 'MD-VBZ' pattern. If that pattern is identified in a response, then the stored feedback is retrieved and displayed.

Figure 6A:
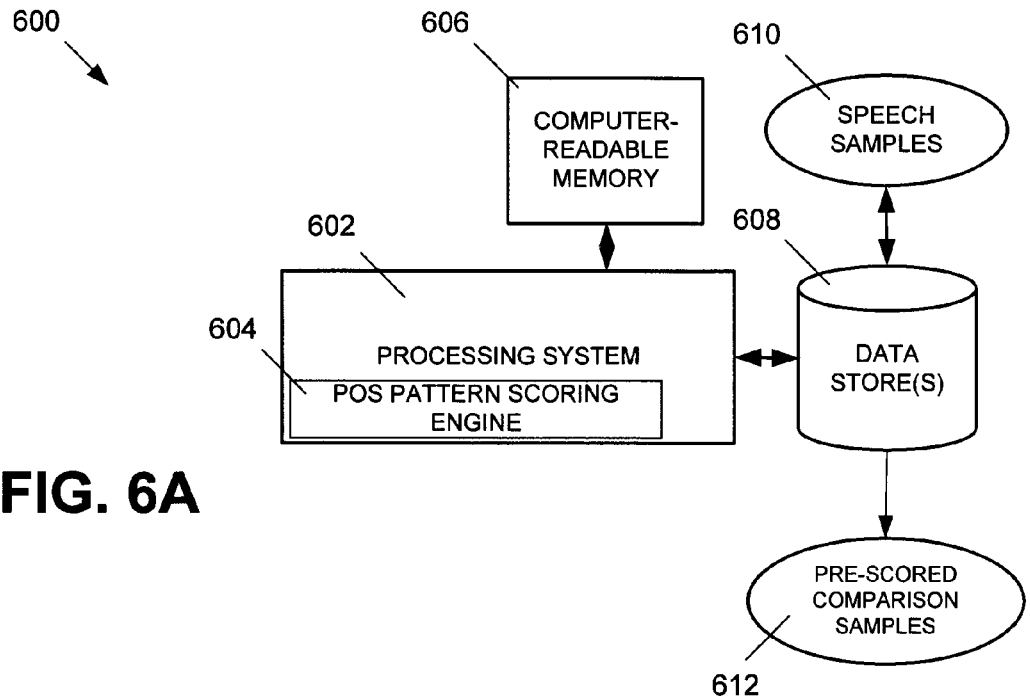
FIGS. 6A, 6B, and 6C depict example systems for use in implementing a part of speech scoring engine.
Figure 6B:
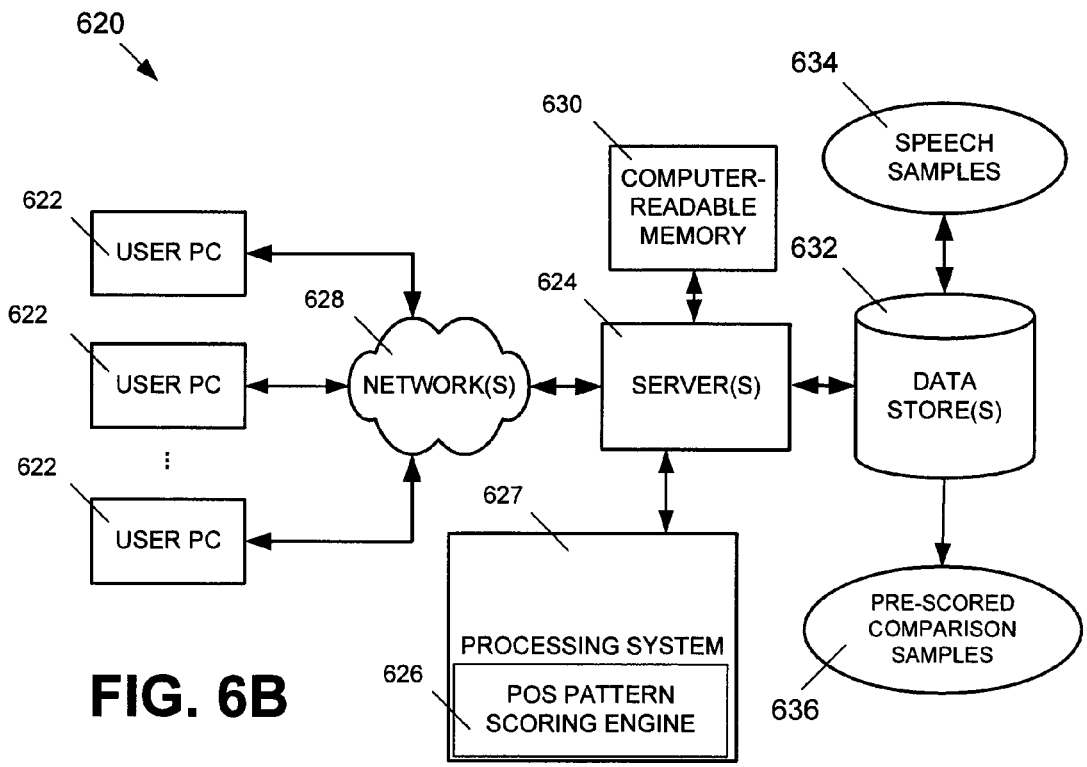
Figure 6C:
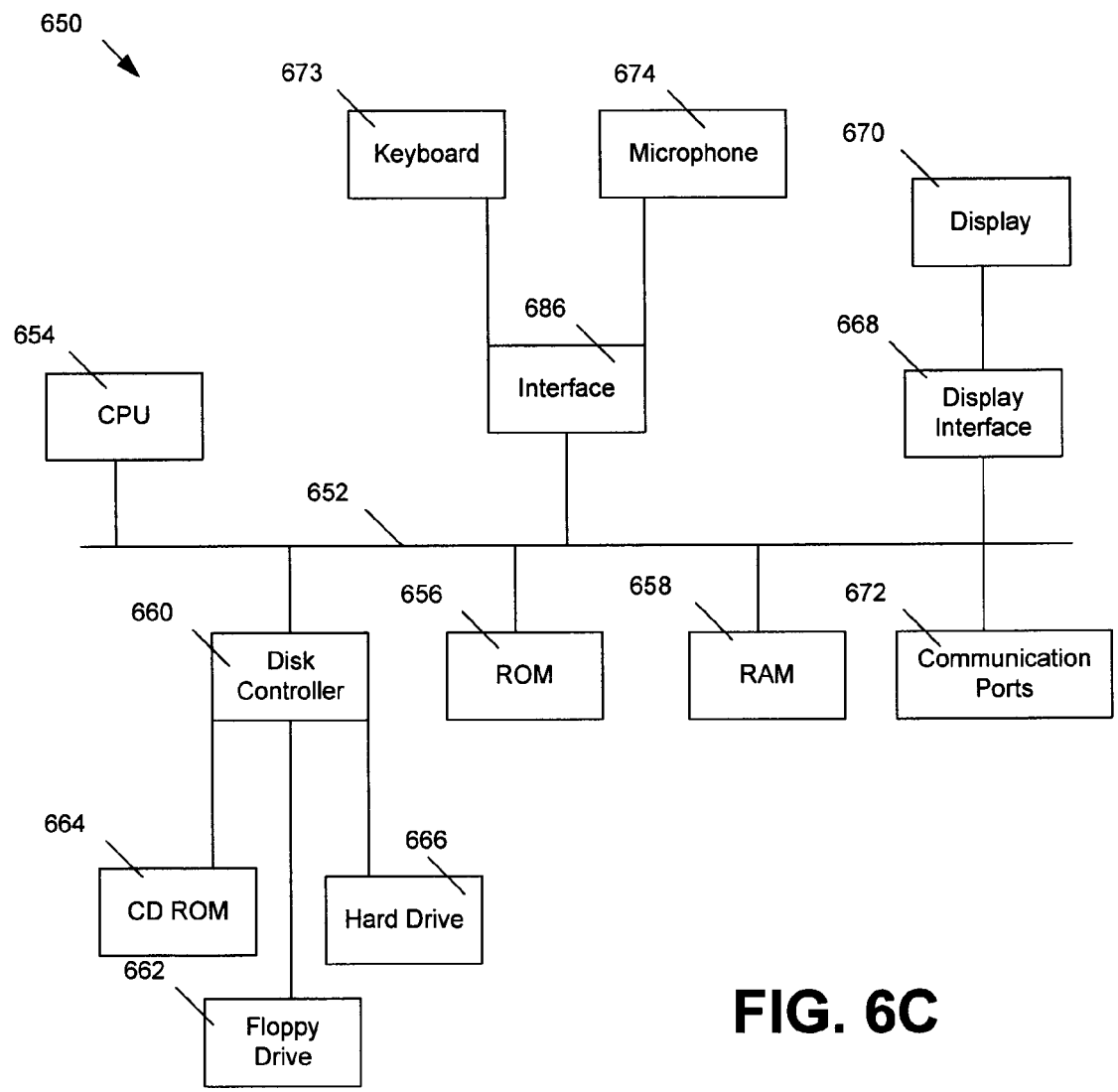

Examples have been used to describe the invention herein, and the scope of the invention may include other examples. FIGS. 6A, 6B, and 6C depict example systems for use in implementing a part of speech pattern scoring engine. For example, FIG. 6A depicts an exemplary system 600 that includes a standalone computer architecture where a processing system 602 (e.g., one or more computer processors located in a given computer or in multiple computers that may be separate and distinct from one another) includes a part of speech pattern scoring engine 604 being executed on it. The processing system 602 has access to a computer-readable memory 606 in addition to one or more data stores 608. The one or more data stores 608 may include speech samples 610 as well as pre-scored comparison samples 612, as well as data structures for storing part of speech and patterns of a speech sample as well as identification of pre-determined part of speech patterns that are identified as being present in the speech samples.

FIG. 6B depicts a system 620 that includes a client server architecture. One or more user PCs 622 access one or more servers 624 running a part of speech pattern scoring engine 626 on a processing system 627 via one or more networks 628. The one or more servers 624 may access a computer readable memory 630 as well as one or more data stores 632. The one or more data stores 632 may contain speech samples 634 as well as pre-scored comparison samples 636.

FIG. 6C shows a block diagram of exemplary hardware for a standalone computer architecture 650, such as the architecture depicted in FIG. 6A that may be used to contain and/or implement the program instructions of system embodiments of the present invention. A bus 652 may serve as the information highway interconnecting the other illustrated components of the hardware. A processing system 654 labeled CPU (central processing unit) (e.g., one or more computer processors at a given computer or at multiple computers), may perform calculations and logic operations required to execute a program. A non-transitory processor-readable storage medium, such as read only memory (ROM) 656 and random access memory (RAM) 658, may be in communication with the processing system 654 and may contain one or more programming instructions for performing the method of implementing a part of speech pattern scoring engine. Optionally, program instructions may be stored on a non-transitory computer readable storage medium such as a magnetic disk, optical disk, recordable memory device, flash memory, or other physical storage medium.

A disk controller 660 interfaces one or more optional disk drives to the system bus 652. These disk drives may be external or internal floppy disk drives such as 662, external or internal CD-ROM, CD-R, CD-RW or DVD drives such as 664, or external or internal hard drives 666. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 660, the ROM 656 and/or the RAM 658. Preferably, the processor 654 may access each component as required.

A display interface 668 may permit information from the bus 652 to be displayed on a display 670 in audio, graphic, or alphanumeric format. Communication with external devices may optionally occur using various communication ports 672.

In addition to the standard computer-type components, the hardware may also include data input devices, such as a keyboard 673, or other input device 674, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of scoring a speech sample, comprising:
    performing automatic speech recognition with an automatic speech recognizer to generate a transcription of the sample, the automatic speech recognizer comprising a computerized language model and a computerized acoustic model trained based on speech samples from multiple speakers, and storing words of the transcription in a first data structure;
    associating the words of the transcription with part of speech labels with a computer processing system based on an analysis of the words with the processing system;
    generating part of speech sequences based on the part of speech labels with the computer processing system and storing the part of speech sequences in a second data structure;
    generating a first vector comprising the part of speech sequences and associated first numerical weights, each first numerical weight indicating a relative frequency of the associated part of speech sequence in the speech sample or a presence of the associated part of speech sequence in the speech sample;
    calculating a similarity score between the first vector and each of multiple score-level vectors, each score-level vector comprising (i) part of speech sequences occurring in a set of speech samples of a training corpus, each speech sample of the set being assigned a same score, and (ii) associated second numerical weights, each second numerical weight being based on a relative frequency of the associated part of speech sequence in the set and a relative importance of the associated part of speech sequence in differentiating speech samples assigned the score of the set from speech samples assigned different scores; and
    comparing the similarity scores using the computer processing system and scoring the speech sample with a computerized scoring model based on the comparison.

2. The method of claim 1, wherein the generating the grammar metric includes:
    transcribing a set of speech samples from a training corpus to generate a set of transcriptions;
    assigning a score to each speech sample of the set of speech samples, the score indicating a level of grammaticality of the transcription; and
    generating, for each sub-set of transcriptions assigned a same score, a score-level vector.

3. The method of claim 2, wherein the scores assigned to the speech samples of the training corpus are assigned by one or more humans.

4. The method of claim 1, wherein the part of speech labels are associated using an automated part of speech tagger.

5. The method of claim 1, further comprising providing a feedback about grammatical usage based on the part of speech sequences.

6. The method of claim 5, wherein the feedback is provided to a speaker of the speech sample based on a detection of a particular part of speech sequence.

7. The method of claim 5, wherein a particular part of speech sequence is classified into multiple groups.

8. The method of claim 7, wherein the multiple groups comprise a grammatically erroneous sequence, a grammatically unsophisticated sequence, or grammatically sophisticated sequence.

9. The method of claim 8, wherein the grammatically erroneous sequence is a double comparative expression.

10. The method of claim 8, wherein the grammatically sophisticated sequence is a relative clause sequence.

11. The method of claim 8, wherein the feedback is provided based on a count of part of speech sequences included in each of the multiple groups.

12. The method of claim 1, wherein a particular part of speech sequence includes multiple adjacent parts of speech.

13. The method of claim 1, wherein the speech sample is spoken by a non-native speaker.

14. A computer-implemented system for scoring speech, comprising:
    one or more data processors;
    one or more computer-readable mediums encoded with instructions for commanding the one or more data processors to execute steps that include:
        performing automatic speech recognition on the speech sample with an automatic speech recognizer to generate a transcription of the sample, the automatic speech recognizer comprising a computerized language model and a computerized acoustic model trained based on speech samples from multiple speakers, and storing words of the transcription in a first data structure;
        associating the words of the transcription with part of speech labels based on an analysis of the words;
        generating part of speech sequences based on the part of speech labels and storing the part of speech sequences in a second data structure;
        generating a first vector comprising the part of speech sequences and associated first numerical weights, each first numerical weight indicating a relative frequency of the associated part of speech sequence in the speech sample or a presence of the associated part of speech sequence in the speech sample;

calculating a similarity score between the first vector and each of multiple score-level vectors, each score-level vector comprising (i) part of speech sequences occurring in a set of speech samples of a training corpus, each speech sample of the set being assigned a same score, and (ii) associated second numerical weights, each second numerical weight being based on a relative frequency of the associated part of speech sequence in the set and a relative importance of the associated part of speech sequence in differentiating speech samples assigned the score of the set from speech samples assigned different scores; and comparing the similarity scores and scoring the speech sample with a computerized scoring model based on the comparison.

15. The system of claim 14, wherein the part of speech labels are associated using an automated part of speech tagger.

16. The system of claim 14, wherein the steps further comprise providing a feedback about grammatical usage based on the part of speech sequences.

17. The system of claim 16, wherein the feedback is provided to a speaker of the speech sample based on a detection of a particular part of speech sequence.

18. A non-transitory computer-readable medium encoded with instructions for commanding a processing system to execute steps for scoring speech, wherein the steps include:

performing automatic speech recognition on the speech sample with an automatic speech recognizer to generate a transcription of the sample, the automatic speech recognizer comprising a computerized language model and a computerized acoustic model trained based on speech samples from multiple speakers, and storing words of the transcription in a first data structure;

associating the words of the transcription with part of speech labels based on an analysis of the words;

generating part of speech sequences based on the part of speech labels and storing the part of speech sequences in a second data structure;

generating a first vector comprising the part of speech sequences and associated first numerical weights, each first numerical weight indicating a relative frequency of the associated part of speech sequence in the speech sample or a presence of the associated part of speech sequence in the speech sample;

calculating a similarity score between the first vector and each of multiple score-level vectors, each score-level vector comprising (i) part of speech sequences occurring in a set of speech samples of a training corpus, each speech sample of the set being assigned a same score, and (ii) associated second numerical weights, each second numerical weight being based on a relative frequency of the associated part of speech sequence in the set and a relative importance of the associated part of speech sequence in differentiating speech samples assigned the score of the set from speech samples assigned different scores; and comparing the similarity scores and scoring the speech sample with a computerized scoring model based on the comparison.

19. The computer-implemented method of claim 1, wherein the part of speech sequences do not comprise sequences of words included in the transcription.

20. The computer-implemented method of claim 1, wherein each of the part of speech sequences comprises a first part of speech and a second part of speech in an order.

21. The computer-implemented method of claim 1, further comprising:

determining a presence of first part of speech sequences associated with grammatically sophisticated speech in the speech sample; and determining a presence of second part of speech sequences associated with grammatically unsophisticated speech in the speech sample, wherein the speech sample is scored based on the presences of the first and second part of speech sequences.

* * * * *